United States Patent

Krueger

Patent Number: 6,000,860
Date of Patent: Dec. 14, 1999

[54] METHOD FOR CONTROLLING A FOCAL-PLANE SHUTTER HAVING TWO MOTORS

[75] Inventor: Roland Krueger, Wolfenbuettel, Germany

[73] Assignee: Rollei Fototechnic GmbH, Braunschweig, Germany

[21] Appl. No.: 09/122,767

[22] Filed: Jul. 27, 1998

[51] Int. Cl.⁶ .................................................. G03B 9/08
[52] U.S. Cl. ...................................................... 396/469
[58] Field of Search ............................ 396/453, 463–470

[56] References Cited

U.S. PATENT DOCUMENTS 4,290,682  9/1981  Saito et al. .............................. 354/234
5,333,025  7/1994  Dowe ....................................... 396/469

FOREIGN PATENT DOCUMENTS 2526420  12/1976  Germany .

Primary Examiner—Howard B. Blankenship
Attorney, Agent, or Firm—Foley & Lardner

[57] ABSTRACT

The invention relates to a method for controlling an electronically directly driven focal-plane shutter which has two lightproof curtains, each of which is associated with, and controlled by, an electric drive motor. The drive motors move the curtains across an image field. One curtain starts in a closed position, and the other curtain starts in an open position prior to taking the exposure. So as to achieve operating sequences of the two curtains which are as identical as possible, both drive motors initially are driven simultaneously in an "open" direction. The curtain which starts in the open position first is pressed against a defined open-position stop. Then, by reversing the associated drive motor, that curtain is moved in the "close" direction to complete the exposure.

2 Claims, 2 Drawing Sheets

METHOD FOR CONTROLLING A FOCAL-PLANE SHUTTER HAVING TWO MOTORS

BACKGROUND OF THE INVENTION

The invention relates to a novel method of driving an electronically directly driven focal-plane shutter.

In camera technology, a focal-plane shutter is an assembly which consists essentially of two motor-driven lightproof curtains. In the basic position, the first curtain is closed, and the second curtain is open. In order to take an exposure, the first curtain is opened, and then the second curtain is closed. The operating time of the shutter is the time it takes a curtain to move across the image field.

If it is desirable to achieve exposure times which are markedly shorter than the operating time of the curtains, it is necessary to begin closing the second curtain immediately after the first curtain starts to open. A slot is then formed, which runs across the image field. For example, in an exposure time of ¼₀₀₀ sec, a slot width of 2 mm is produced in a run length of 24 mm.

The operating sequences of the two curtains must therefore be as identical as possible, which can be achieved in mechanically driven shutters (e.g., driven by a spring loaded actuator, acting as a mechanical drive) by means of corresponding compensation measures.

SUMMARY OF THE INVENTION

The invention is based on the development of an electronically directly driven shutter. In such shutters, the first and second curtains each have their own drive motor. Here, however, a problem is that the operating speed of the curtain is directly dependent upon the current through the drive motor and thus also upon the available voltage. The invention is partly based on the following considerations.

If, initially, the first motor is started, the battery voltage dips slightly. When the second motor starts, the voltage again dips somewhat. Hence, the first motor is started under different conditions than the second motor. Therefore, synchronous operation of the two motors no longer applies. If both the first and second motors were activated in an "open" direction, this would mean that the second motor would press the second curtain, already in an open position, against a stop. In this case, it would be advantageous for the battery to be preloaded by both motors, and thus for both motors to have electrically identical preconditions. Then, when the second motor starts and its direction is reversed (while the direction of the first motor remains the same), it would not alter the load. Nevertheless, from a mechanical point of view, the second motor would start from a prestressed state, which would likewise lead to operating fluctuations.

Accordingly, an the object of the invention is to control an electronically directly driven focal-plane shutter in such a manner that the operating sequences of its first and second curtains are as identical as possible.

This object may be achieved according to a first embodiment of the invention, in which a method for controlling a focal-plane shutter includes providing an electronically directly driven focal-plane shutter having first and second lightproof curtains. First and second electric drive motors are associated with the first and second curtains, respectively, to drive the curtains across the image field. Prior to taking an exposure, the first curtain starts in an open position, and a second curtain starts in a closed position. The first drive motor moves the first curtain from the open position to a closed position, and the second drive motor moves the second curtain from the closed position to an open position. Initially, both drive motors are driven simultaneously in the "open" direction, and the first curtain, which starts in an open position, is pressed against a defined open-position stop. Then, by reversing the drive direction, the first curtain is moved in the "close" direction to complete the exposure.

In an alternative embodiment in accordance with the invention, a method for controlling a focal-plane shutter includes, initially, activating the first drive motor in an open direction so that the first curtain, starting in the open position, is pressed against a defined open-position stop. The second drive motor is activated in a closed direction so that the second curtain, starting in the closed position, is pressed against a closed-position stop. To take the exposure, first, the direction of the second drive motor is reversed to move the second curtain from the closed position to the open position, and second, the direction of the first drive motor is reversed to move the first curtain from the open position to the closed position.

Both embodiments ensure that the two curtains have the same mechanical and electrical boundary conditions during operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description above and the detailed description of the preferred embodiment given below, serve to explain the principles of the invention.

DETAILED DESCRIPTION OF THE PREFERRED EMBODIMENTS

Figure 1:
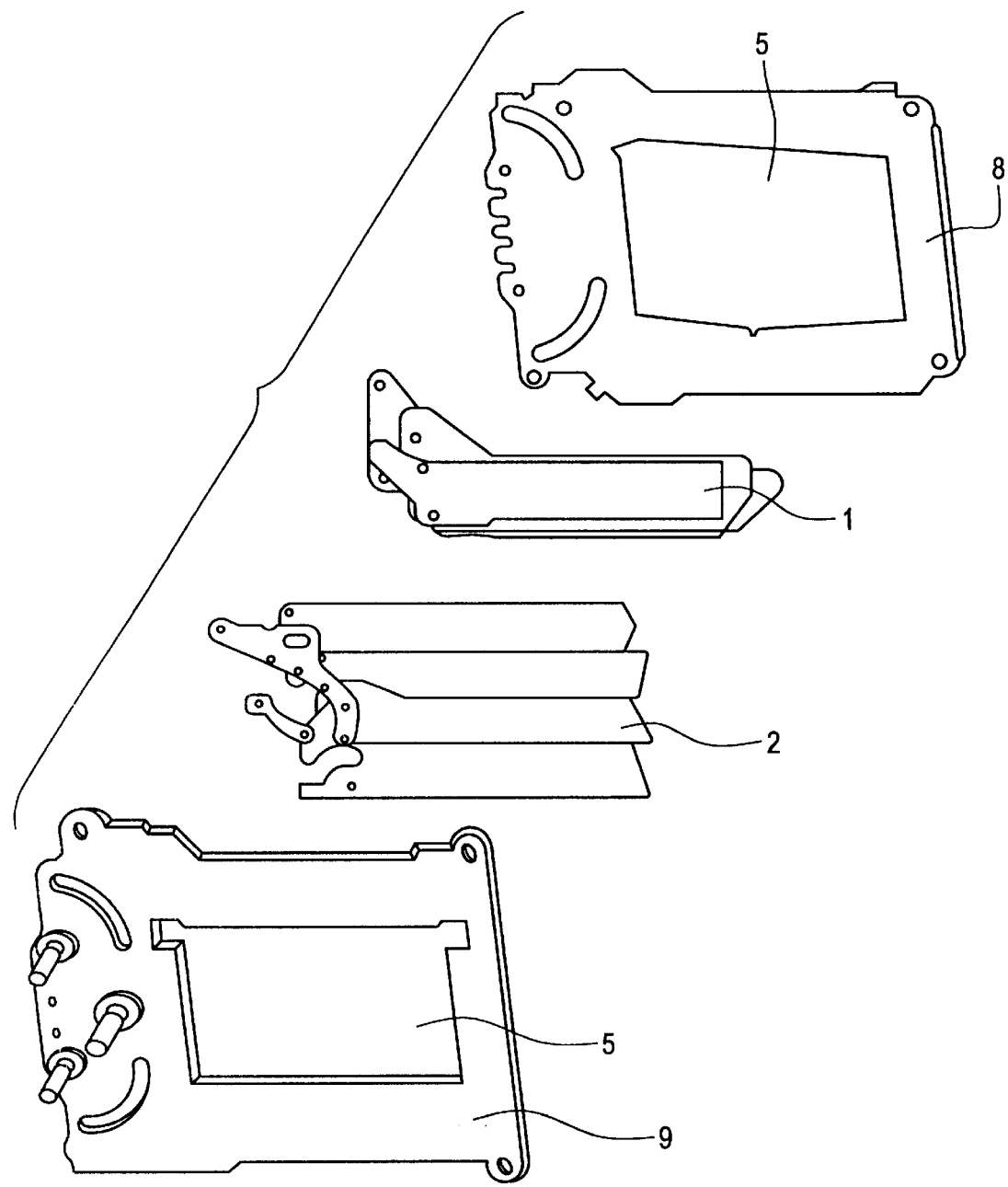
FIG. 1 shows an exploded view of the main components of a focal-plane shutter, without the drive motors.

Referring now to the drawings, wherein like numerals indicate like parts, and initially to FIG. 1, there will be seen an exploded view of a focal-plane shutter in accordance with the invention. The focal-plane shutter includes a first curtain 1 (shown in an open position) and a second curtain 2 (shown in a closed position) arranged between two plates 8 and 9. The first and second curtains 1 and 2 can move across the image field 5 provided in these plates 8 and 9. The first curtain 1 is associated with, and controlled by, a first drive motor 3, and the second curtain 2 is associated with, and controlled by, a second drive motor 4. The drive motors 3 and 4 move the curtains 1 and 2, respectively, between open and closed positions.

Figure 2:
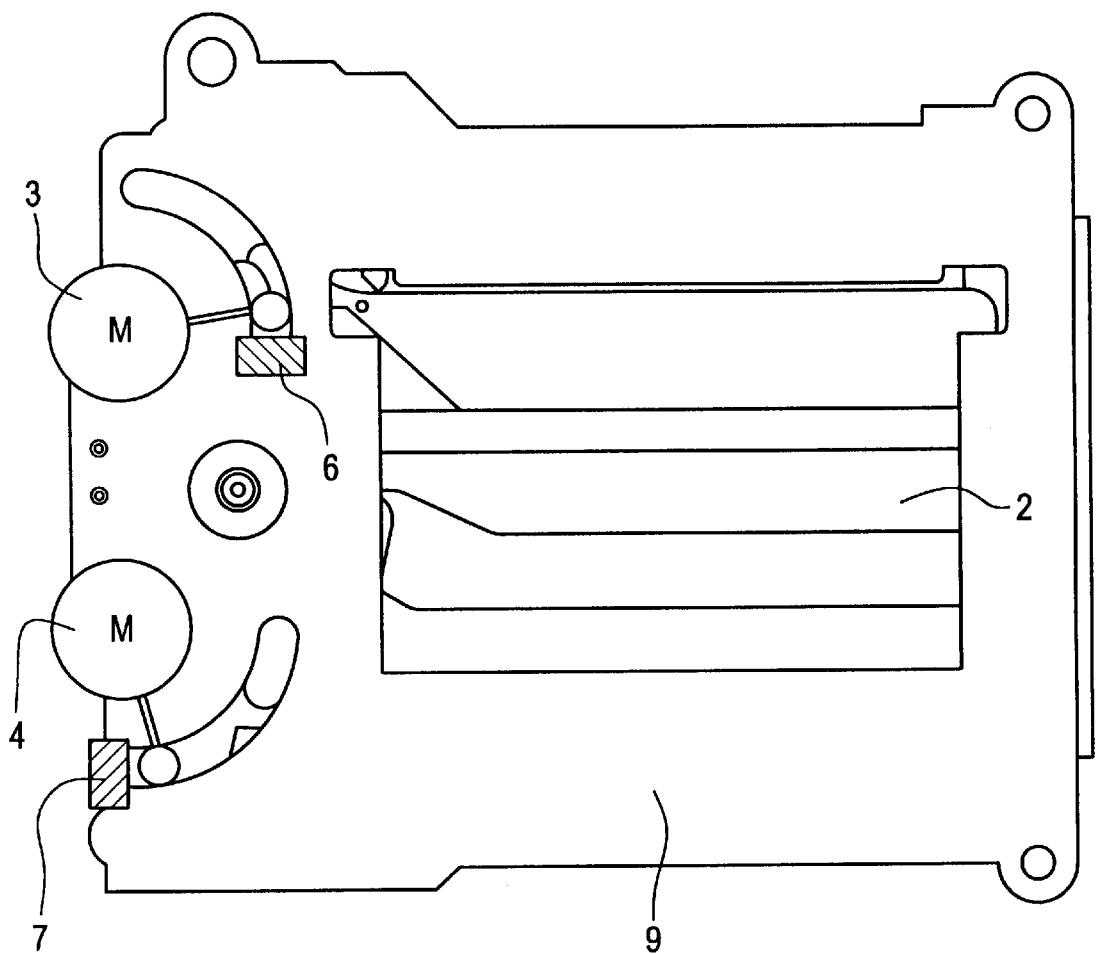
FIG. 2 shows a plan view of the focal-plane shutter shown in FIG. 1, including schematic representations of the drive motors.

FIG. 2 shows an open-position stop 6 for the first curtain 1 or its associated drive motor 3 and a closed-position stop 7 for the second curtain 2 or its associated drive motor 4. In one embodiment, initially, both drive motors 3 and 4 are driven simultaneously in the "open" direction, and the first curtain 1, which starts in an open position, is pressed against the open-position stop 7. Then, by reversing the drive direction of the first drive motor 3, the first curtain 1 is moved in the "close" direction to complete the exposure.

In another embodiment, starting from the initial position illustrated in FIG. 2, both drive motors 3 and 4 can, on starting, be driven simultaneously in such a manner that the first curtain 1, which is in an open position, is pressed against the open-position stop 6, and the second curtain 2, which is in a closed position, is pressed against the closed-position stop 7. Then, to take the exposure, the drive motor 4 for the closed second curtain 2 is reversed to an "open" direction and, subsequently, the drive motor 3 for the open first curtain 1 is reversed to the "close" direction. In this manner, the second curtain passes from closed to open, and the first curtain passes from open to closed, to create a slot through which film may be exposed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A method for controlling a focal-plane shutter, comprising the steps of:

providing an electronically directly driven focal-plane shutter, the focal-plane shutter having a first and a second lightproof curtain and a first and a second electric drive motor associated with the first and second lightproof curtains, respectively;

activating the first drive motor to move the first curtain across the image field from an open position to a closed position; and activating the second drive motor to move the second curtain across the image field from a closed position to an open position, wherein, initially, both the first and the second drive motors are activated simultaneously in an open direction, so that the first curtain, starting in the open position, is pressed against a defined open-position stop, and then, by reversing the direction of the first drive motor, is moved in a close direction to complete the exposure.

2. A method for controlling a focal-plane shutter, comprising the steps of:

providing an electronically directly driven focal-plane shutter, the focal-plane shutter having a first and a second lightproof curtain and a first and a second electric drive motor associated with the first and second lightproof curtains, respectively;

activating the first drive motor to move the first curtain across the image field from an open position to a closed position; and activating the second drive motor to move the second curtain across the image field from a closed position to an open position, wherein, initially, the first drive motor is activated in an open direction so that the first curtain, starting in the open position, is pressed against a defined open-position stop, and the second drive motor is activated in a closed direction so that the second curtain, starting in the closed position, is pressed against a closed-position stop, and then, to take the exposure, first, reversing the direction of the second drive motor to move the second curtain from the closed position to an open position and, second, reversing the direction of the first drive motor to move the first curtain from the open position to the closed position.

* * * * *

UNITED STATES PATENT AND TRADEMARK OFFICE
CERTIFICATE OF CORRECTION

PATENT NO. : 6,000,860
DATED : December 14, 1999
INVENTOR(S) : Roland Krueger.

Page 1 of 1

It is certified that error appears in the above-identified patent and that said Letters Patent is hereby corrected as shown below:

Please insert on the front cover of the patent:
--[30]      Foreign Application Priority Data
Jul. 26, 1997 [DE] Germany..........................197 32 192.5--.

Signed and Sealed this

Twelfth Day of June, 2001

Attest:

NICHOLAS P. GODICI
*Attesting Officer*         *Acting Director of the United States Patent and Trademark Office*